United States Patent
Tokita

(10) Patent No.: US 9,916,316 B2
(45) Date of Patent: Mar. 13, 2018

(54) APPARATUS, METHOD AND MEDIUM FOR CREATING FOLDER SHORTCUTS

(71) Applicant: CANON KABUSHIKI KAISHA, Tokyo (JP)

(72) Inventor: Ken Tokita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 795 days.

(21) Appl. No.: 14/100,991

(22) Filed: Dec. 9, 2013

(65) Prior Publication Data

US 2014/0172931 A1    Jun. 19, 2014

(30) Foreign Application Priority Data

Dec. 14, 2012    (JP) .................. 2012-273624

(51) Int. Cl.
*G06F 17/30*    (2006.01)

(52) U.S. Cl.
CPC .. *G06F 17/30126* (2013.01); *G06F 17/30115* (2013.01)

(58) Field of Classification Search
CPC ......... G06F 17/30082; G06F 17/30091; G06F 17/30126; G06F 17/30; G06F 17/3012; G06F 17/30067; G06F 17/30165; G06F 17/30115
See application file for complete search history.

(56) References Cited

U.S. PATENT DOCUMENTS

2006/0195465 A1* 8/2006 Atchison ........... G06F 17/30011
2008/0201382 A1* 8/2008 Zagorski ........... G06F 17/30117
2012/0110515 A1* 5/2012 Abramoff ......... G06F 17/30994
715/854

FOREIGN PATENT DOCUMENTS

JP    2000-322441    11/2000

OTHER PUBLICATIONS

Badashian, A. S., Afzali, H., Khalkhali, I., Delcheh, M. A., Shafiei, M. S., & Mahdavi, M. (2010). CFM: A File Manager with Multiple Categorization Support. In SEKE (pp. 748-751).*
Kobsa, Alfred. "User experiments with tree visualization systems." Information Visualization, 2004. INFOVIS 2004. IEEE Symposium on. IEEE, 2004.*

* cited by examiner

*Primary Examiner* — Nan Hutton
(74) *Attorney, Agent, or Firm* — Fitzpatrick, Cella, Harper & Scinto

(57) ABSTRACT

To provide a shortcut creating apparatus which creates folder shortcuts for a plurality of folders in a single flow without move to a target folder, and stores the created folder shortcuts in a selected folder. The shortcut creating apparatus according to the present invention includes: (1) a one-way shortcut creating unit configured to create a folder shortcut of a reference folder under a related folder, (2) a one-way shortcut creating unit configured to create a folder shortcut of the related folder under the reference folder, (3) a two-way shortcut creating unit configured to create a folder shortcut of the reference folder under the related folder, and create a folder shortcut of the related folder under the reference folder, and (4) a multiple-shortcut creating unit configured to create respective folder shortcuts of the reference folder and the related folders under folders except under the currently selected folder.

11 Claims, 21 Drawing Sheets

FIG.7

FOLDER INFORMATION

FOLDER NAME [ A1 ]    FOLDER SHORTCUT NAME [ A1_SC ]

CREATE/EDIT SHORTCUT OF RELATED FOLDER          SHARE WITH OTHER USERS ☐

701 — B11_SC
604 — ☑ B11
702 — ONE-WAY (IN) ⦿
703 — ONE-WAY (OUT) ○
704 — TWO-WAY ○
705 (radio buttons)
706

Folder tree: B1 ☐ — B11 ☑ — B12 ☐ — C1 ☐ — C11 ☐ — C111 ☐ — C12 ☐ — D1 ☐

[ EXECUTE ]  [ CANCEL ]

RELATED FOLDER SHORTCUT LIST

📁 B11 / B11_SC / ONE-WAY (IN)

FOLDER INFORMATION

FOLDER NAME [ A1 ]   FOLDER SHORTCUT NAME [ A1_SC ]

SHARE WITH OTHER USERS ☐

CREATE/EDIT SHORTCUT OF RELATED FOLDER

☐ B1
　↑
　☐ B11 [B11_SC]   ONE-WAY (IN) ○   ONE-WAY (OUT) ○   TWO-WAY ○   MULTI ●
　☐ B12 ☐
☐ C1
　↑
　☐ C11 [C11_SC]   ONE-WAY (IN) ○   ONE-WAY (OUT) ○   TWO-WAY ○   MULTI ●   801
　　☐ C111 ☐
　☐ C12 [C12_SC]   ONE-WAY (IN) ○   ONE-WAY (OUT) ○   TWO-WAY ○   MULTI ●
☐ D1 ☐

[ EXECUTE ]   [ CANCEL ]

RELATED FOLDER SHORTCUT LIST

📁 B11 / B11_SC / MULTI
📁 C11 / C11_SC / MULTI
📁 C11 /C12_SC / MULTI

FIG.8

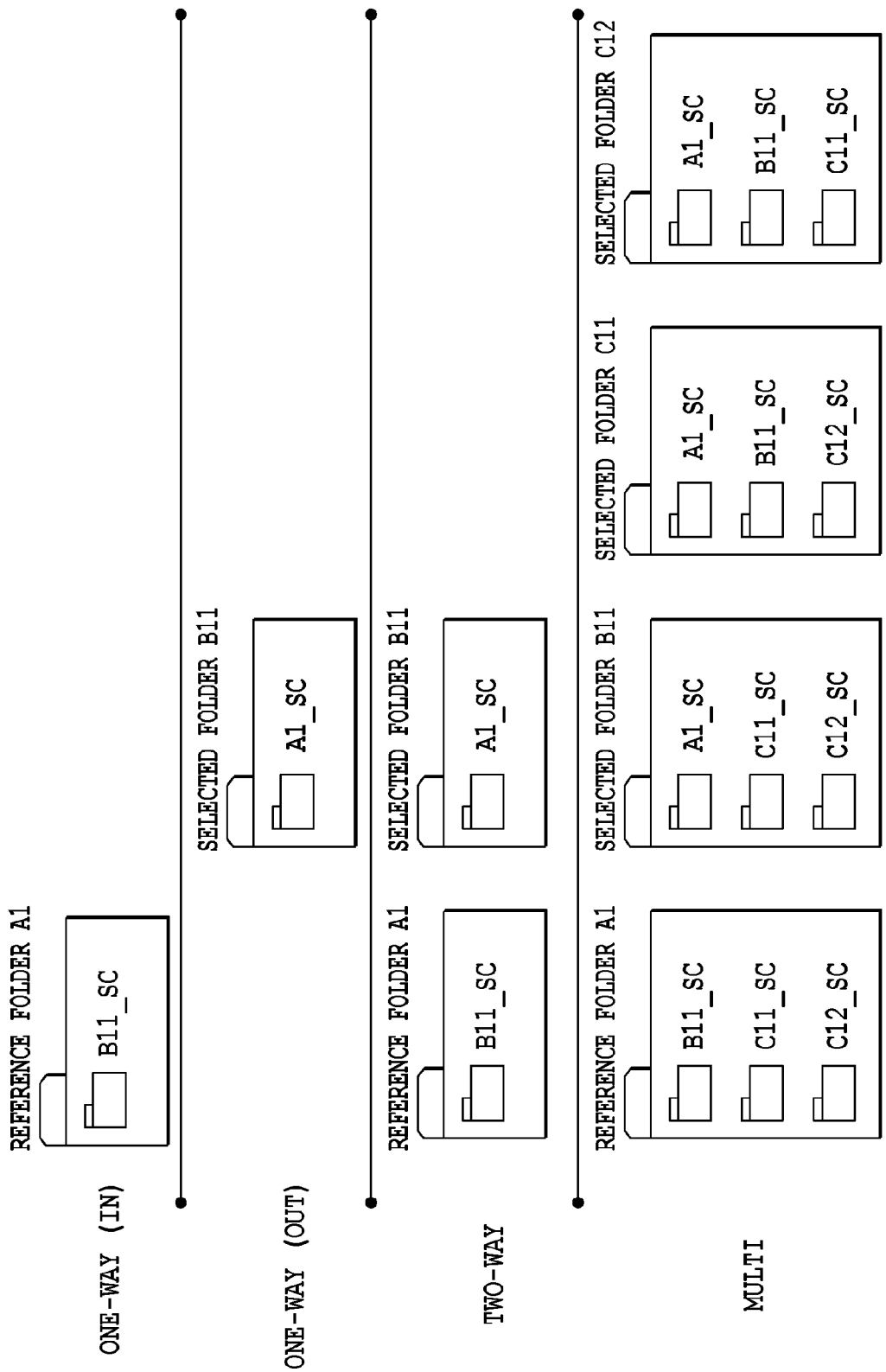

APPARATUS, METHOD AND MEDIUM FOR CREATING FOLDER SHORTCUTS

BACKGROUND OF THE INVENTION

Field of the Invention

The present invention relates to an apparatus, a method, and a program for creating folder shortcuts. Specifically, the present invention relates to an apparatus, a method, and a program which creates folder shortcuts of a plurality of folders, and stores the created folder shortcuts in a selected folder.

Description of the Related Art

In case of looking for a target folder on a document management system, a general method is to track down a hierarchy, selecting a folder on a tree or a folder on a pane in a folder. In addition, there is also a method which creates a folder shortcut of the target folder and moves to the target folder by selecting the created folder shortcut so as to omit the procedure of the aforementioned method. However, for a user working across a plurality of related folders, it is troublesome to create folder shortcuts for a plurality of folders and move them under the necessary folder.

Japanese Patent Laid-Open No. 2000-322441 discloses a technique of sharing information between users. In the system described in Japanese Patent Laid-Open No. 2000-322441, in a case where a user moves to a folder of another user and browses it in order to share information of the other user, the user stores a pointer of a folder of the other user in a folder of the user, and stores a pointer of the folder of the user in the folder of the other user. Accordingly, a two-way link is established between the folder of the user and the folder of the other user, and thus information is shared between the users.

However, prior art such as Japanese Patent Laid-Open No. 2000-322441 may not establish a link without move to the target folder. In addition, since the link which can be established is a two-way link, there is a problem that only two folders can have shortcuts created thereto by a single flow.

The present invention has been made in view of the above problem. It is an object of the present invention to provide an apparatus, a method, and a program which create folder shortcuts for a plurality of (two or more) folders in a single flow without move to a target folder, and store the created folder shortcuts in a selected folder.

SUMMARY OF THE INVENTION

The present invention is a shortcut creating apparatus including at least one of: a unit configured to create a one-way shortcut, which creates, by selecting a reference folder and a folder related to the reference folder, a folder shortcut of the reference folder under the folder related to the reference folder; a unit configured to create a one-way shortcut, which creates, by selecting the reference folder and a folder related to the reference folder, a folder shortcut of the folder related to the reference folder under the reference folder; a unit configured to create a two-way shortcut, which creates, by selecting the reference folder and a folder related to the reference folder, a folder shortcut of the reference folder under the folder related to the reference folder, and creates a folder shortcut of the folder related to the reference folder under the reference folder; and a unit configured to create multiple shortcuts, which creates, by selecting the reference folder and two or more folders related to the reference folder, respective folder shortcuts for the reference folder and the two or more folders related to the reference folder under folders except under the currently selected folder.

The present invention can provide a system, a method, and a program which create folder shortcuts for a plurality of folders in a single flow, and store the created shortcuts in a selected folder.

Further features of the present invention will become apparent from the following description of exemplary embodiments (with reference to the attached drawings).

BRIEF DESCRIPTION OF THE DRAWINGS

FIG. 7 illustrates an exemplary shortcut creation pattern display in a case where one related folder is selected, according to Embodiment 1 of the present invention;

FIG. 8 illustrates an exemplary shortcut creation pattern display in a case where a plurality of related folders is selected, according to Embodiment 1 of the present invention;

FIG. 9 illustrates a shortcut created under a folder by a shortcut creation pattern, according to Embodiment 1 of the present invention;

DESCRIPTION OF THE EMBODIMENTS

Figure 1:
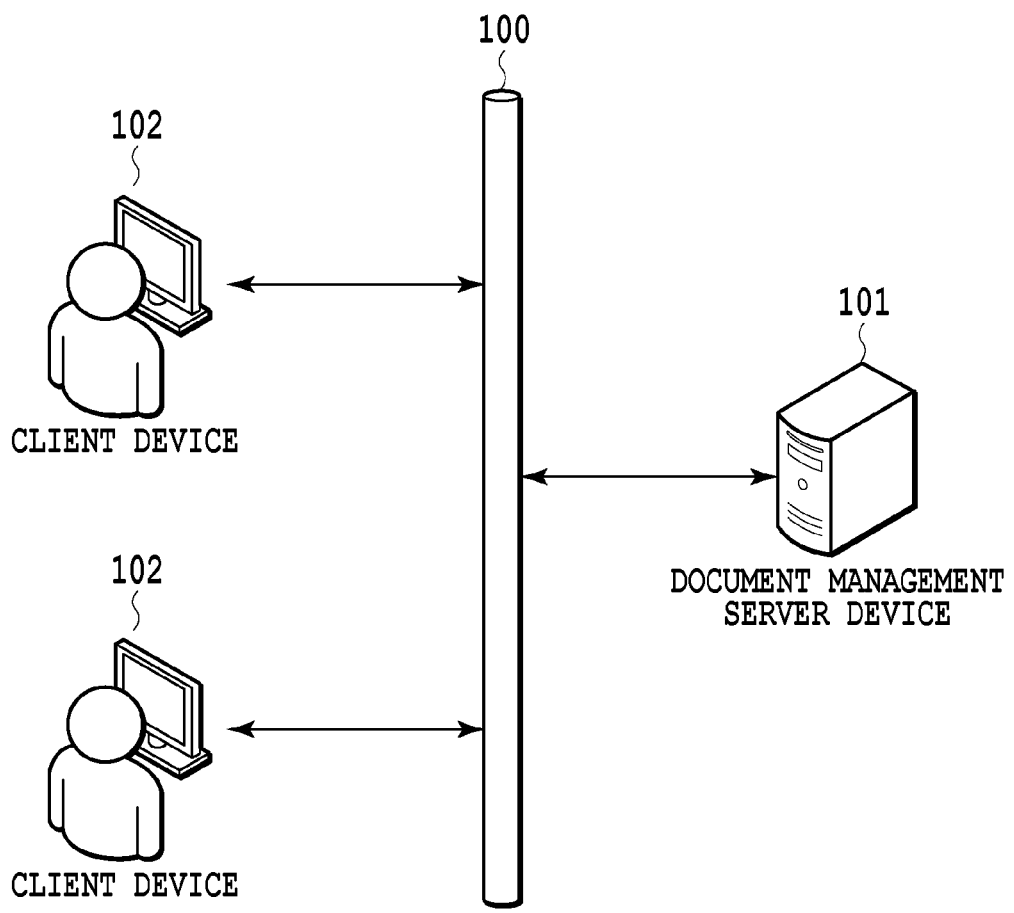
FIG. 1 is a system conceptual diagram of a document management system according to Embodiment 1 of the present invention.

In the following, the best mode for carrying out the present invention will be described, referring to the drawings.

Embodiment 1

In the following, a first embodiment (Embodiment 1) of the present invention will be described, based on FIGS. 1 to 14B.

[System Configuration]

FIG. 1 is a conceptual diagram illustrating a configuration of the overall system including a document management server device, according to Embodiment 1. As illustrated in FIG. 1, the system includes a document management server device 101, a client device 102, and a network 100.

The document management server device 101, providing a version-based document management function, provides document information and files under management according to requests from the client device 102.

The client device 102 is a user interface for displaying or manipulating document information of the document management server device 101. As illustrated in FIG. 1, there may exist a plurality of the client devices 102 in the system, without being particularly limited to one.

Although the present embodiment will be described assuming that the network 100 is the Internet, the network 100 may be other network systems such as a Local Area Network (referred to as LAN in the present specification).

[Hardware Configuration of Document Management Server Device]

Figure 2:
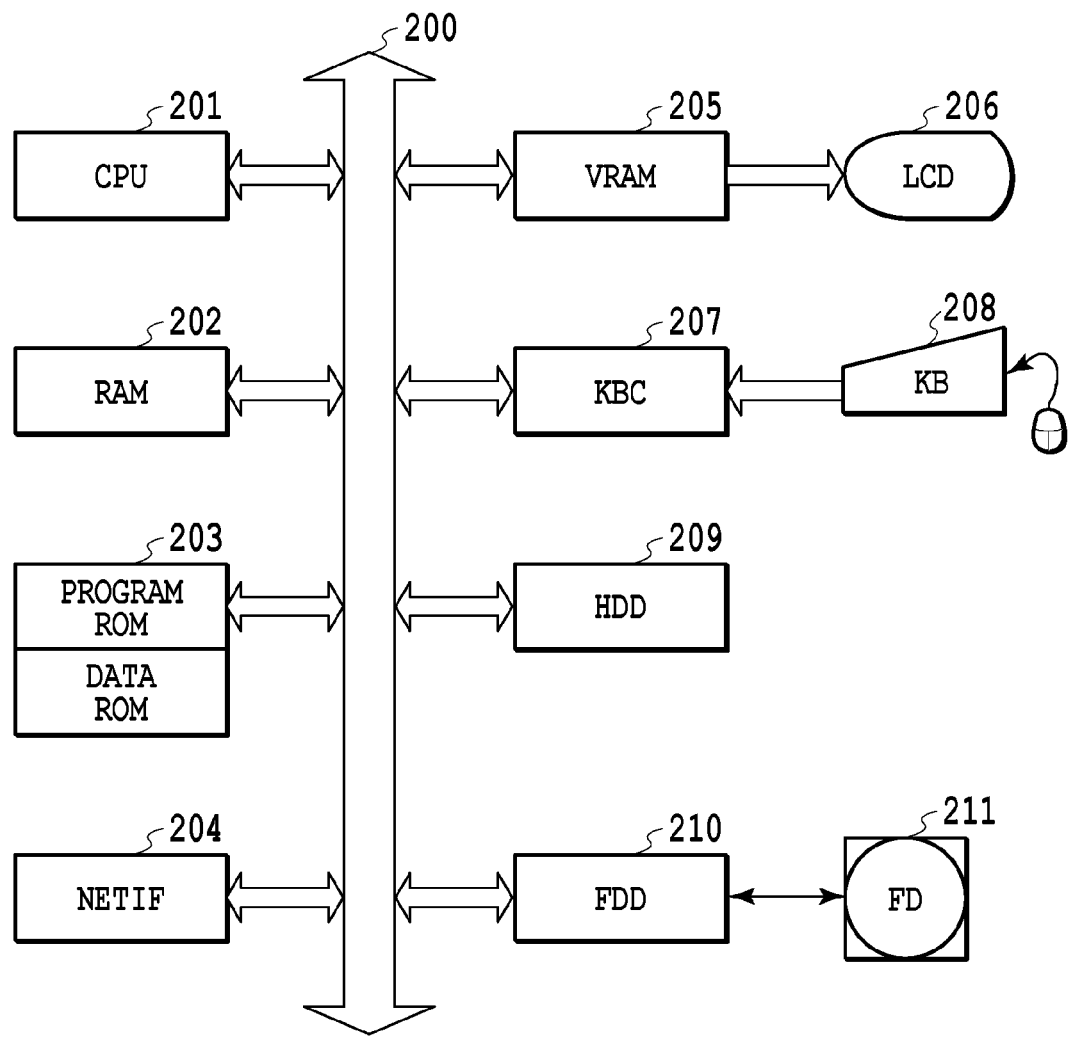
FIG. 2 illustrates a hardware configuration of a document management server device according to Embodiment 1 of the present invention.

FIG. 2 illustrates a hardware configuration of the document management server device according to Embodiment 1.

A central processing unit (CPU) 201 is in charge of operation/control of an information processor. A random access memory (RAM) 202 functions as the main memory of the CPU 201. In addition, the RAM 202 functions as the storage area of an executable program, the execution area of the executable program, and the data area of the executable program.

A read only memory (ROM) 203 stores operation processing procedures of the CPU 201. The ROM 203 includes a program ROM having recorded therein basic software (OS) which is a system program performing device control of the information processor, and a data ROM having recorded therein information required for operating the system. In addition, there may be a case where an HDD 209 described below is used in place of the ROM 203. A series of processes according to the present embodiment are performed by execution by the CPU 201 of programs stored in the program ROM for executing the present embodiment.

A network interface (NETIF) 204 performs controls for data transfer to and from external devices via the network 100, or diagnoses the connection status of the server device to the network 100. A video RAM (VRAM) 205 lays out images for display on the screen of an LCD 206 described below, and controls display of the images.

A display device (LCD) 206 is a display or the like, indicating the operation status of the information processor.

A keyboard controller (KBC) 207 is a controller for controlling signals input from a KB 208 described below.

An external input device (KB) 208 is a device for accepting operations performed by the user. For example, a pointing device such as a keyboard or a mouse is used as the KB 208.

A hard disk drive (HDD) 209 stores application programs or various data. Application programs in the present embodiment are software programs or the like executed by various processing units in the present embodiment.

An external input-output device (FDD) 210 is a device for inputting or outputting data of a magnetic recording medium such as a flexible disk drive, an optical recording medium such as a CD-ROM drive, a removable disk of a magneto optical storage media such as an MO, or a semiconductor recording medium such as a memory card. For example, the external input-output device (FDD) 210 is used for reading aforementioned application programs or the like from a recording medium.

A removable medium (FD) 211 is a removable data recording medium which stores data to be read by the FDD 210. The removable media (FD) 211 is, for example, a magnetic recording medium (e.g., flexible disk), an optical recording medium (e.g., CD-ROM), a magneto optical recording medium (e.g., MO), or a semiconductor recording medium (e.g., memory card).

It is also possible that application programs and data stored in the HDD 209 are read from the FD 211 by the FDD 210 and used for subsequent processing.

[Software Configuration of Document Management Server Device]

Figure 3:
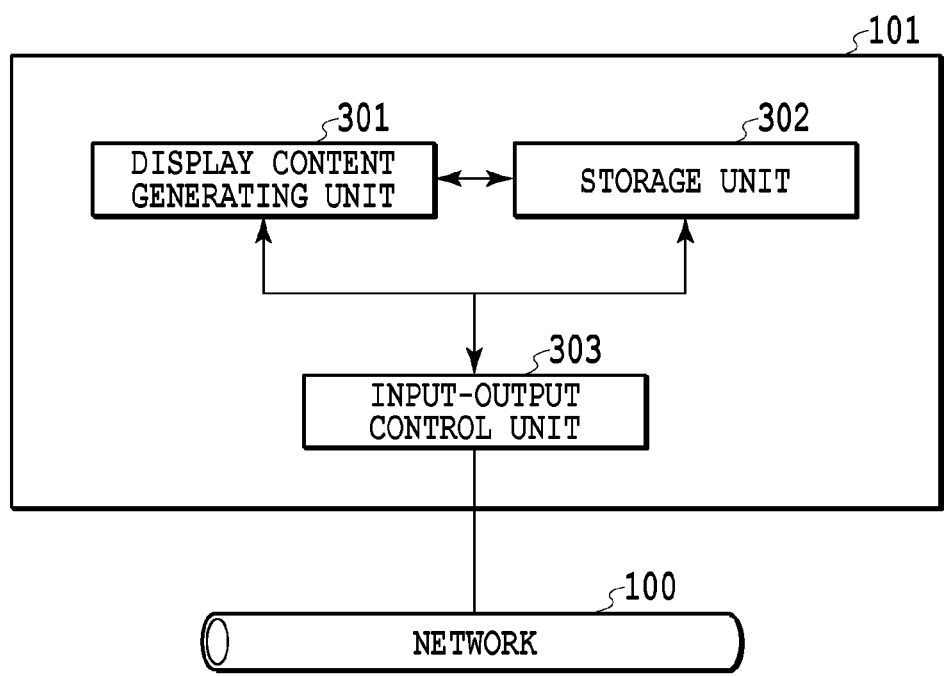
FIG. 3 illustrates a software configuration of the document management server device according to Embodiment 1 of the present invention.

FIG. 3 illustrates a software configuration of the document management server device according to Embodiment 1 of the present invention.

A document management server device 101 includes a display content generating unit 301, a storage unit 302, and an input-output control unit 303.

A display content generating unit 301 controls a process of generating display information stored in the RAM 202 for presenting, to the user of the client device 102, the result of processing in another process control unit.

The storage unit 302, including a storage device such as the HDD 209, stores document information and input-output information obtained by the document management server device.

The input-output control unit 303, stored in the RAM 202, controls transmission to the client device 102 and reception from the client device 102.

[Hardware Configuration of Client Device]

Figure 4:
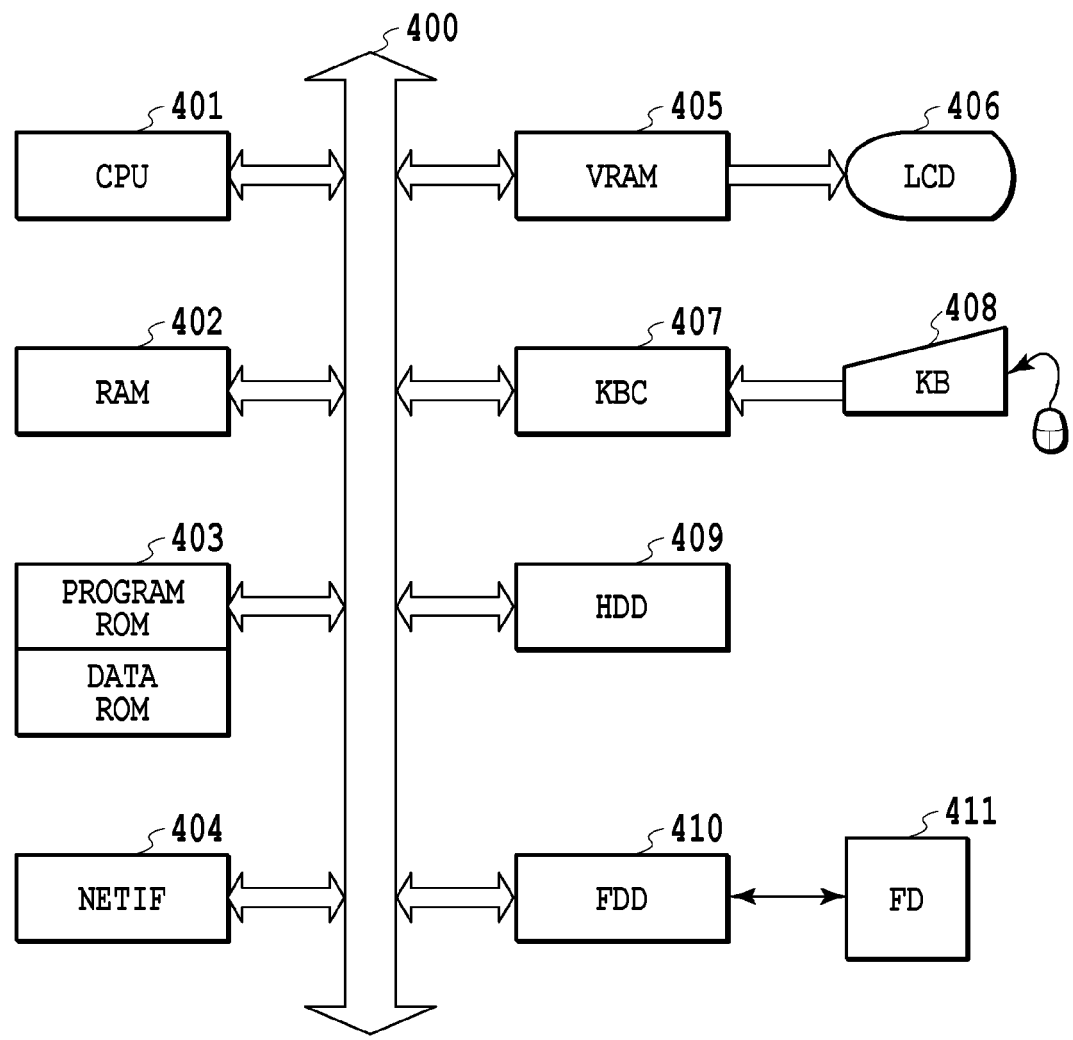
FIG. 4 illustrates a hardware configuration of a client device according to Embodiment 1 of the present invention.

FIG. 4 illustrates a hardware configuration of a client device according to Embodiment 1.

A central processing unit (CPU) 401 is in charge of operation/control of the information processor. A random access memory (RAM) 402 functions as the main memory of the CPU 401. In addition, the RAM 402 functions as the storage area of an executable program, the execution area of the executable program, and the data area of the executable program.

A read only memory (ROM) 403 stores operation processing procedures of the CPU 401. The ROM 403 includes a program ROM having recorded therein basic software (OS) which is a system program performing device control of the information processor, and a data ROM having recorded therein information required for operating the system. In addition, there may be a case where an HDD 409 described below is used in place of the ROM 403. A series of processes according to the present embodiment are performed by execution by the CPU 401 of programs stored in the program ROM for executing the present embodiment.

A network interface (NETIF) 404 performs controls for data transfer to and from external devices via the network 100, or diagnoses the connection status of the client device to the network 100. A video RAM (VRAM) 405 lays out images for display on the screen of an LCD 406 described below, and controls display of the images.

A display device (LCD) 406 is a display or the like, indicating the operation status or the like of the information processor.

A keyboard controller (KBC) 407 is a controller for controlling signals input from a KB 408 described below.

An external input device (KB) 408 is a device for accepting operations performed by the user. For example, a pointing device such as a keyboard and a mouse is used as the KB 408.

A hard disk drive (HDD) 409 stores application programs or various data. Application programs in the present embodiment are software programs or the like executed by various processing units in the present embodiment.

An external input-output device (FDD) 410 is a device for inputting or outputting data of a magnetic recording medium such as a flexible disk drive, an optical recording medium such as a CD-ROM drive, a removable disk of a magneto optical recording medium such as MO, or a semiconductor recording medium such as a memory card. For example, the external input-output device (FDD) 410 is used for reading aforementioned application programs or the like from a recording medium.

A removable media (FD) 411 is a removable data recording medium which stores data to be read by the FDD 410. The removable media (FD) 411 is, for example, a magnetic recording medium (e.g., flexible disk), an optical recording medium (e.g., CD-ROM), a magneto optical recording medium (e.g., MO), or a semiconductor recording medium (e.g., memory card).

It is also possible that application programs and data stored in the HDD 409 are read from the FD 411 by the FDD 410 and used for subsequent processing.

[Software Configuration of Client Device]

Figure 5:
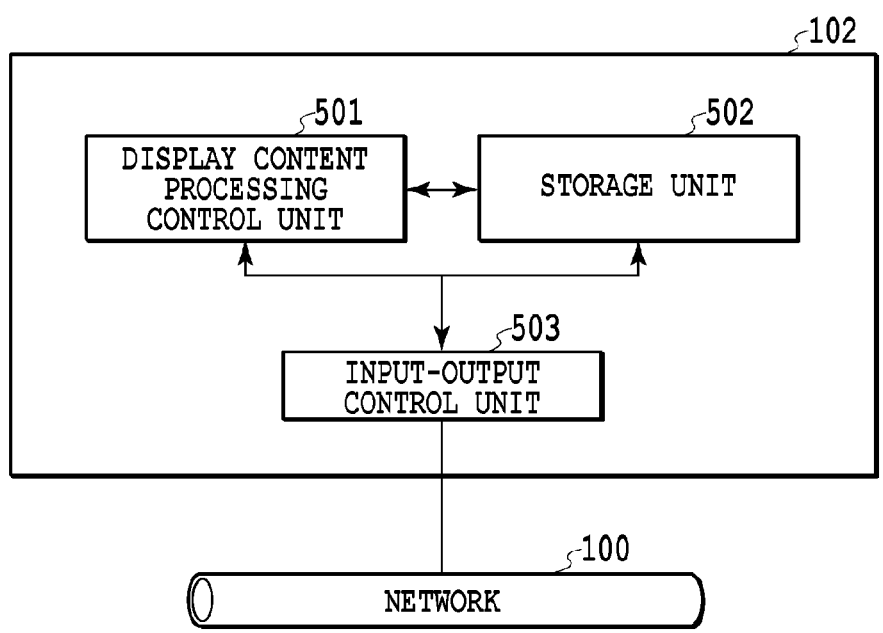
FIG. 5 illustrates a software configuration of the client device according to Embodiment 1 of the present invention.

FIG. 5 illustrates a software configuration of the client device according to Embodiment 1.

A client device 102 includes a display content processing control unit 501, a storage unit 502, and an input-output control unit 503.

The display content processing control unit 501 performs process control for interpreting, and displaying on the LCD 406, information relating to display content transmitted from the document management server device 101, and transmitting, to the document management server device 101, transmission information which has been input using the external input device (KB) 408.

The storage unit 502, including a storage device such as the HDD 409, stores document information and the input-output information obtained by the client device.

The input-output control unit 503, stored in the RAM 402, controls input by the user, transmission to the document management server device 101, and reception from the document management server device 101.

[Folder Shortcut Creation Procedure by Selecting Creation Pattern]

In the following, a method of selecting, on a property screen of a folder specified by the user, a folder related to the specified folder and selecting a shortcut creation pattern, and creating a folder shortcut will be described, referring to FIGS. 6 to 10.

Figure 6:
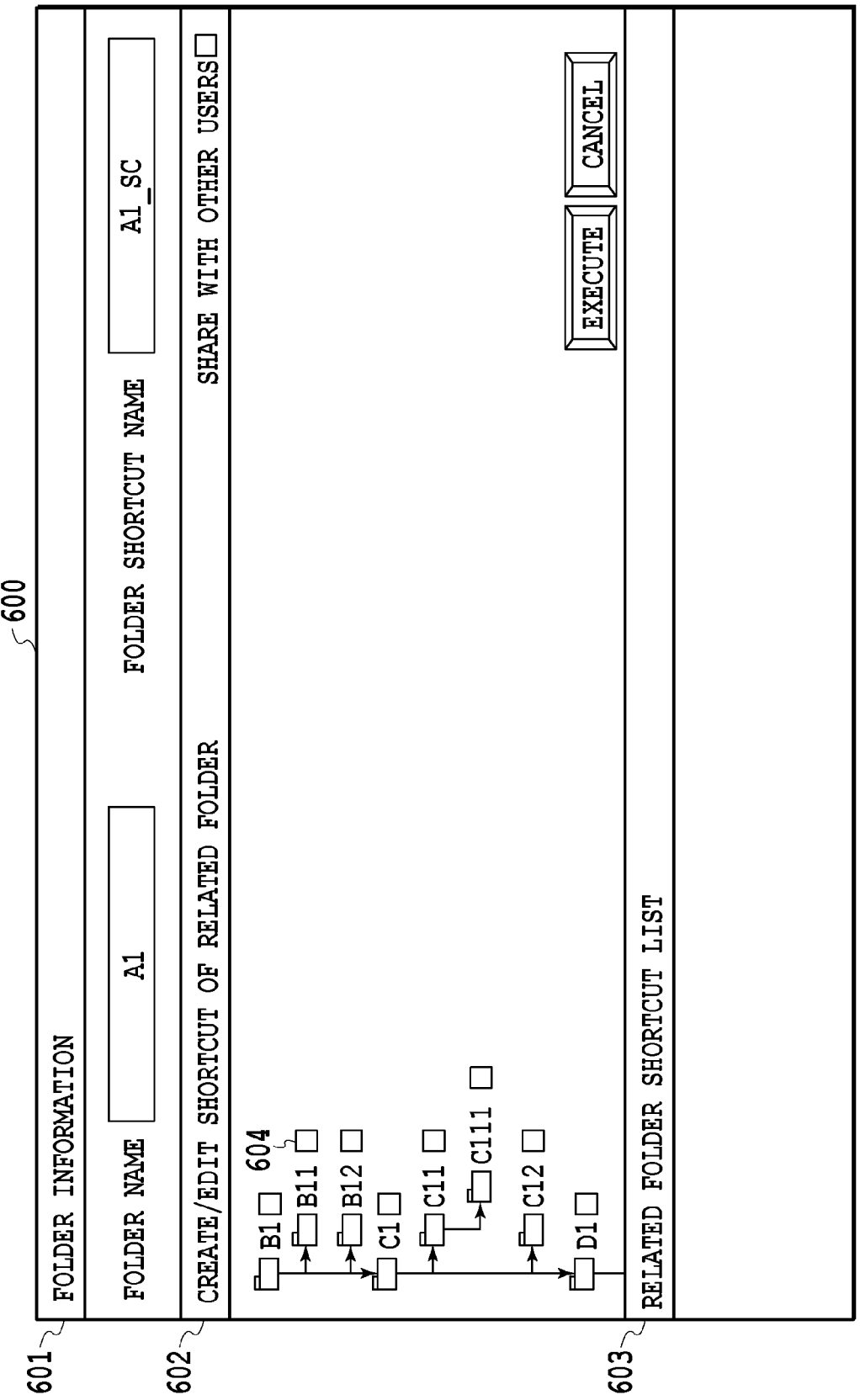
FIG. 6 illustrates an exemplary folder property screen displayed on a display according to Embodiment 1 of the present invention.

FIG. 6 is an exemplary property screen of a folder displayed on the LCD 406 of the client device 102 in a case where the user accesses the document management server device 101 via the client device 102 in order to confirm the property of the folder.

A property screen 600 includes a folder information display region 601, an related folder selection tree display region 602, and an related folder shortcut list display region 603. The folder information display region 601 may have displayed thereon information relating to the specified folders such as a folder name of a folder specified by the user or a shortcut name of the specified folder. The related folder selection tree display region 602 may have displayed thereon, as a tree, folders related to the user-specified folder. The related folder shortcut list display region 603 may have displayed thereon, as a list, folder shortcuts created by selection on the related folder selection tree display region 602.

FIG. 7 illustrates a case where the user has selected one of the check boxes 604 of the folder displayed on the related folder selection tree display region. Checking the selection check box 604 causes a shortcut name input text box 701 of the selected folder, shortcut creation patterns (702 to 704), and radio boxes 705 to be displayed next to the selected folder. A shortcut creation pattern is selected by checking one of the radio boxes 705.

In the following, shortcut creation patterns "one-way (in)" 702, "one-way (out)" 703, and "two-way" 704 will be described.

In a case where the creation pattern "one-way (in)" 702 is selected and executed, a process of creating a shortcut of the selected folder (folder B11 in the example illustrated in FIG. 7) under the reference folder (folder A1 in the example illustrated in FIG. 7) is performed.

In a case where the creation pattern "one-way (out)" 703 is selected and executed, a process of creating a shortcut of the reference folder under the selected folder is performed.

In a case where the creation pattern "two-way" 704 is selected and executed, a process of creating a shortcut of the reference folder under the selected folder is performed, and further, a process of creating a shortcut of the selected folder under the reference folder is performed. That is, selecting and executing the creation pattern "two-way" 704 provides the same result as the processes of the creation patterns "one-way (in)" 702 and "one-way (out)" 703 combined. In addition, the created folder shortcut may be shared not only with the users who created the folder shortcut but also with users of other document management servers, by selecting "share with other users" 706. However, the created folder shortcut is not presented to any user who does not have access right to the folder of the created folder shortcut.

FIG. 8 illustrates a case where the user selected two or more (three in the example illustrated in FIG. 8) selection check boxes 604 of the related folder selection tree display region. Checking the selection check boxes 604 of a plurality of folders causes a shortcut creation pattern "multi" 801 to be displayed additionally.

In the following, the shortcut creation pattern "multi" 801 will be described.

In a case where the creation pattern "multi" 801 is selected and executed for two or more folders, a process which is identical to the process of the creation pattern "two-way" 704 is performed for round-robin pairings between the reference folder and all the selected folders. In the example illustrated in FIG. 8, processing of the "two-way" 704 is performed for the pairs of A1 and B11, A1 and C11, A1 and C12, B11 and C11, B11 and C12, and C11 and C12.

FIG. 9 illustrates a list of shortcuts created under the reference folder and the selected folders by the shortcut creation patterns ("one-way (in)" 702, "one-way (out)" 703, "two-way" 704, and "multi" 801), according to the example described above in reference to FIGS. 7 and 8.

Information of the selected shortcut creation pattern is stored in the storage unit 302 of the document management server device as shortcut management information.

Figure 10:
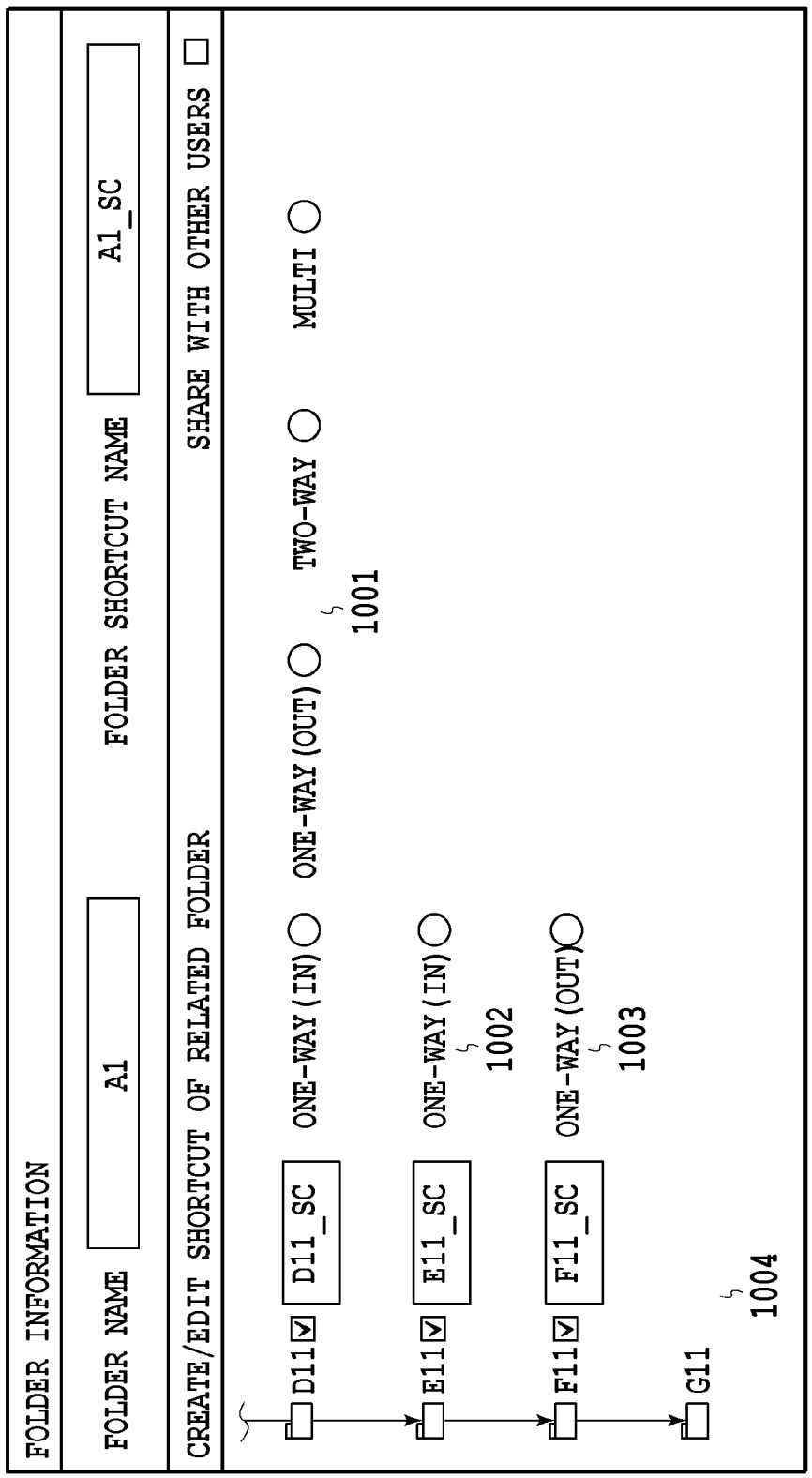
FIG. 10 illustrates a change of display caused by the access right relating to the shortcut creation pattern, according to Embodiment 1 of the present invention.

FIG. 10 illustrates the manner in which the display of a shortcut creation pattern varies in accordance with the access right to the user's reference folder and the selected folders. In the present embodiment, three types of access rights are assumed: the creation right (reading, creation, and deletion of files in the selected folder are permitted), the reading right (reading of files in the selected folder is permitted, whereas creation and deletion of files in the selected folder are prohibited), and the prohibit-reading right (reading of files in the folder is prohibited).

A shortcut creation pattern display 1001 is displayed in a case where the user has the creation right for both the reference folder A1 and a selected folder D11. However, as described above, it is necessary to select two or more selectable folders in order to realize multiple display.

A shortcut creation pattern display 1002 is displayed in a case where the user has the creation right for the reference folder A1 and the reading right for a selected folder E11. Since the user does not have the creation right for the selected folder E11 and thus cannot create a shortcut of the reference folder A1 under E11, the shortcut creation patterns "one-way (out)", "two-way", and "multi" are not displayed.

A shortcut creation pattern display 1003 is displayed in a case where the user has the reading right for the reference folder A1 and the creation right for a selected folder F11. Since the user does not have the creation right for the reference folder A1 and thus cannot create a shortcut of the selected folder F11 under the reference folder A1, the shortcut creation patterns "one-way (in)", "two-way", and "multi" are not displayed.

A shortcut creation pattern display 1004 is displayed in a case where the user has the reading right for the reference folder A1 and a selected folder G11. Since the user does not have the creation right for both the reference folder A1 and the selected folder G11 and thus cannot create a shortcut under the reference folder A1 and the selected folder G11, no check box for displaying the shortcut creation pattern is displayed. There may also be a configuration such that the folder icon itself is not displayed. A folder prohibiting the user to read therefrom is not displayed in the related folder shortcut list display region 603.

In addition, in a case where selection of the selected folder is cancelled and the shortcut creation pattern is changed by the user, it is also possible to delete the created shortcut by updating the shortcut management information.

In the following, the process flow according to the system will be described, referring to flowcharts (FIGS. 11 to 14B).

<Displaying Procedure of Selectable Shortcut Creation Pattern>

Figure 11:
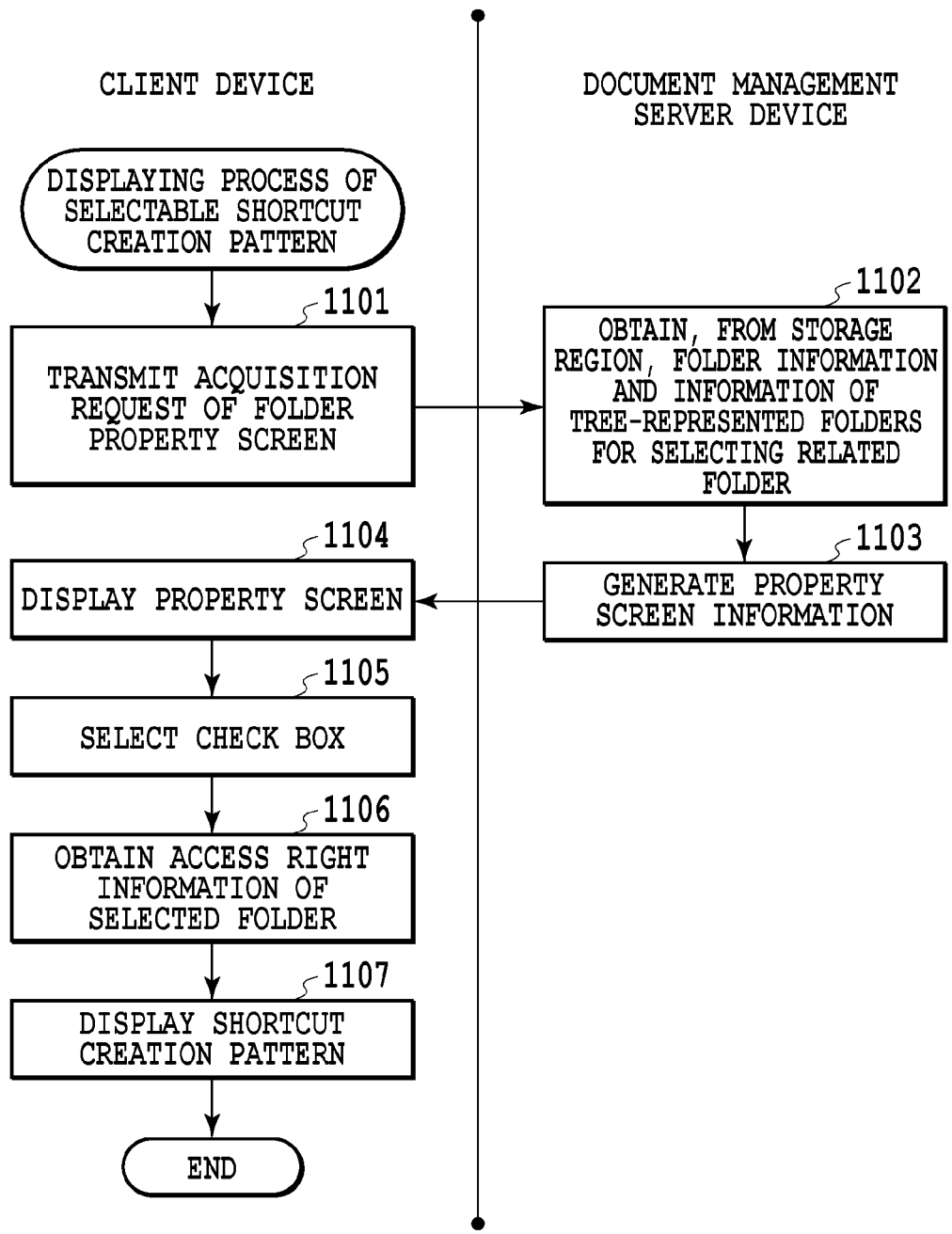
FIG. 11 is a flowchart illustrating the process flow of a shortcut creation pattern display procedure, according to Embodiment 1 of the present invention.

FIG. 11 is a flowchart illustrating the process flow of a procedure of displaying a property screen as illustrated in FIG. 6 and a selection shortcut creation pattern as illustrated in FIG. 7 on the LCD 406 of the client device 102 by the display content processing control unit 501 of the client device 102.

At step S1101, the client device 102 transmits an acquisition request of a folder property screen to the document management server device 101.

At step S1102, the document management server device 101 obtains, from the storage unit 302, folder information (basic information, path, access right information) about the folder, and information of folders displayed as a tree for selecting a folder related to the folder. In the following, information of the folder displayed as a tree for selecting a folder related to the folder is referred to as "related folder selection tree-represented folder information". The related folder selection tree-represented folder information includes access right information, shortcut creation pattern information, or the like.

At step S1103, a display content generating unit 301 of the document management server device 101 generates property screen information of the folder from the folder information and the related folder selection tree-represented folder information obtained at step S1102. The input-output control unit 303 of the document management server device 101 transmits the generated property screen information to the client device 102.

At step S1104, the display content processing control unit 501 of the client device 102 displays a folder property screen as illustrated in FIG. 6 on the LCD 406 according to the property screen information transmitted from the document management server device 101. In addition, the display content processing control unit 501 of the client device 102 stores, in the storage unit 502 of the client device, the folder information and the related folder selection tree-represented folder information transmitted from the document management server device 101.

At step S1105, a check box is selected by the user. As an example, a case where the selection check box 604 is checked as illustrated in FIG. 7 will be considered.

At step S1106, the display content processing control unit 501 of the client device 102 obtains access right information of the selected folder (B11 in the example illustrated in FIG. 7) from the storage unit 502.

At step S1107, the display content processing control unit 501 of the client device 102 displays, on the LCD 406, a shortcut creation pattern which is selectable by the user according to the obtained access right information. In the present specification, the user-selectable shortcut creation pattern is also referred to as a "selection shortcut creation pattern". In the example illustrated in FIG. 7, "one-way (in)" 702, "one-way (out)" 703, and "two-way" 704 are displayed.

<Shortcut Creation Procedure by Selection and Execution of a Selection Shortcut Creation Pattern>

Figure 12:
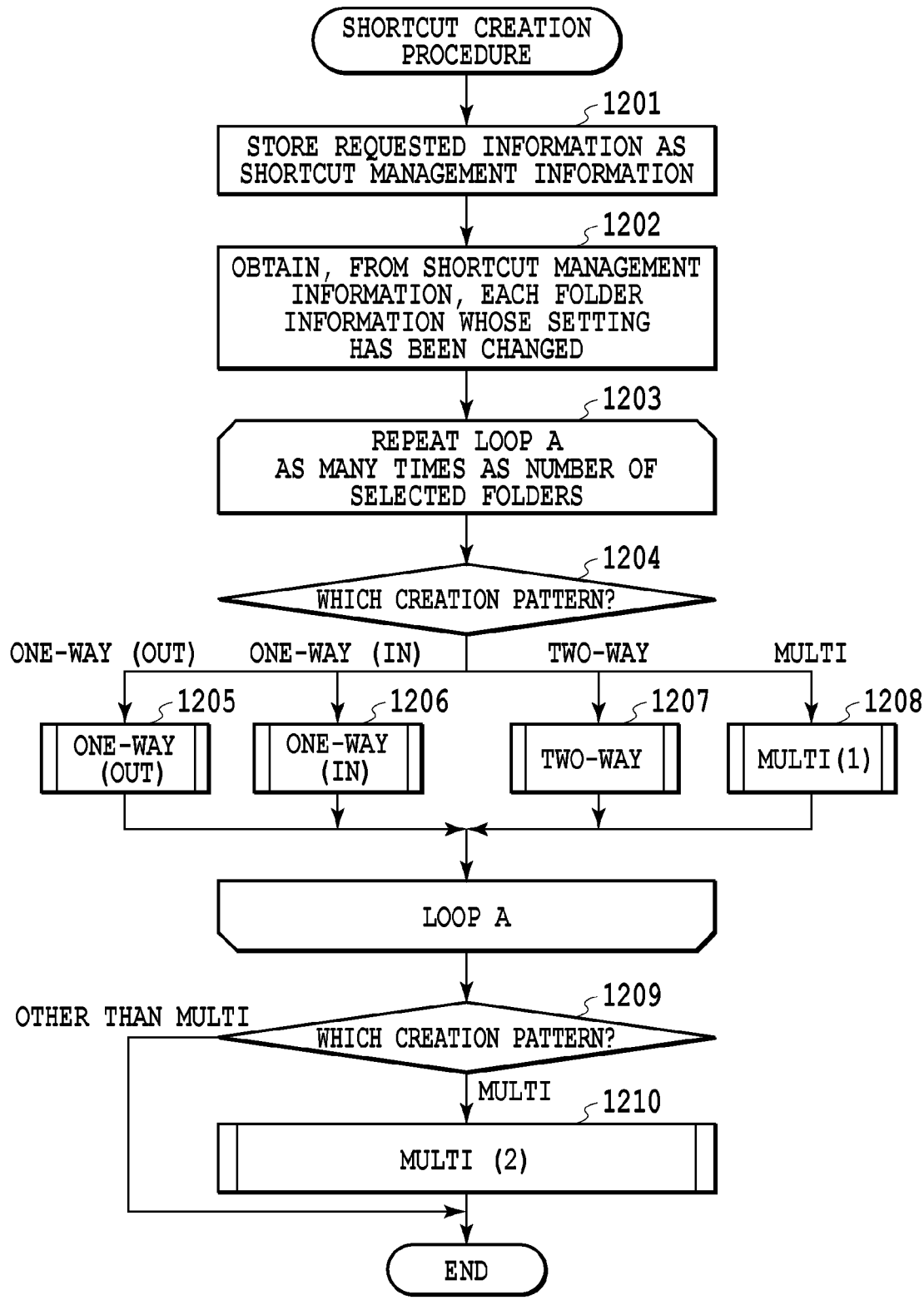
FIG. 12 is a flowchart illustrating the process flow of a shortcut creation procedure by selection and execution of a shortcut creation pattern, according to Embodiment 1 of the present invention.
Figure 13:
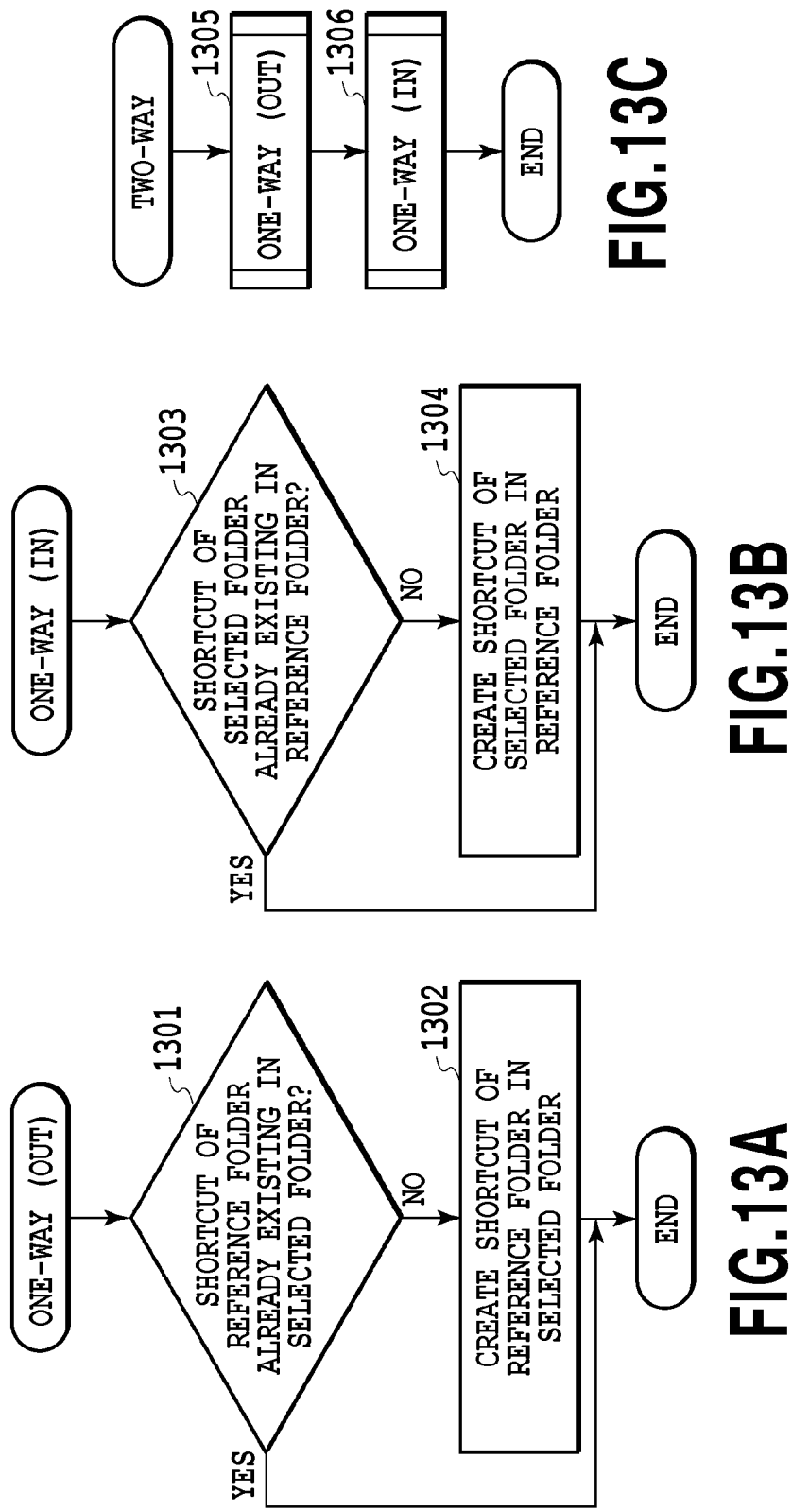
FIGS. 13A to 13C are flowcharts illustrating the detailed process flow of a one-way shortcut creation procedure and a two-way shortcut creation procedure, according to Embodiment 1 of the present invention.
Figure 14:
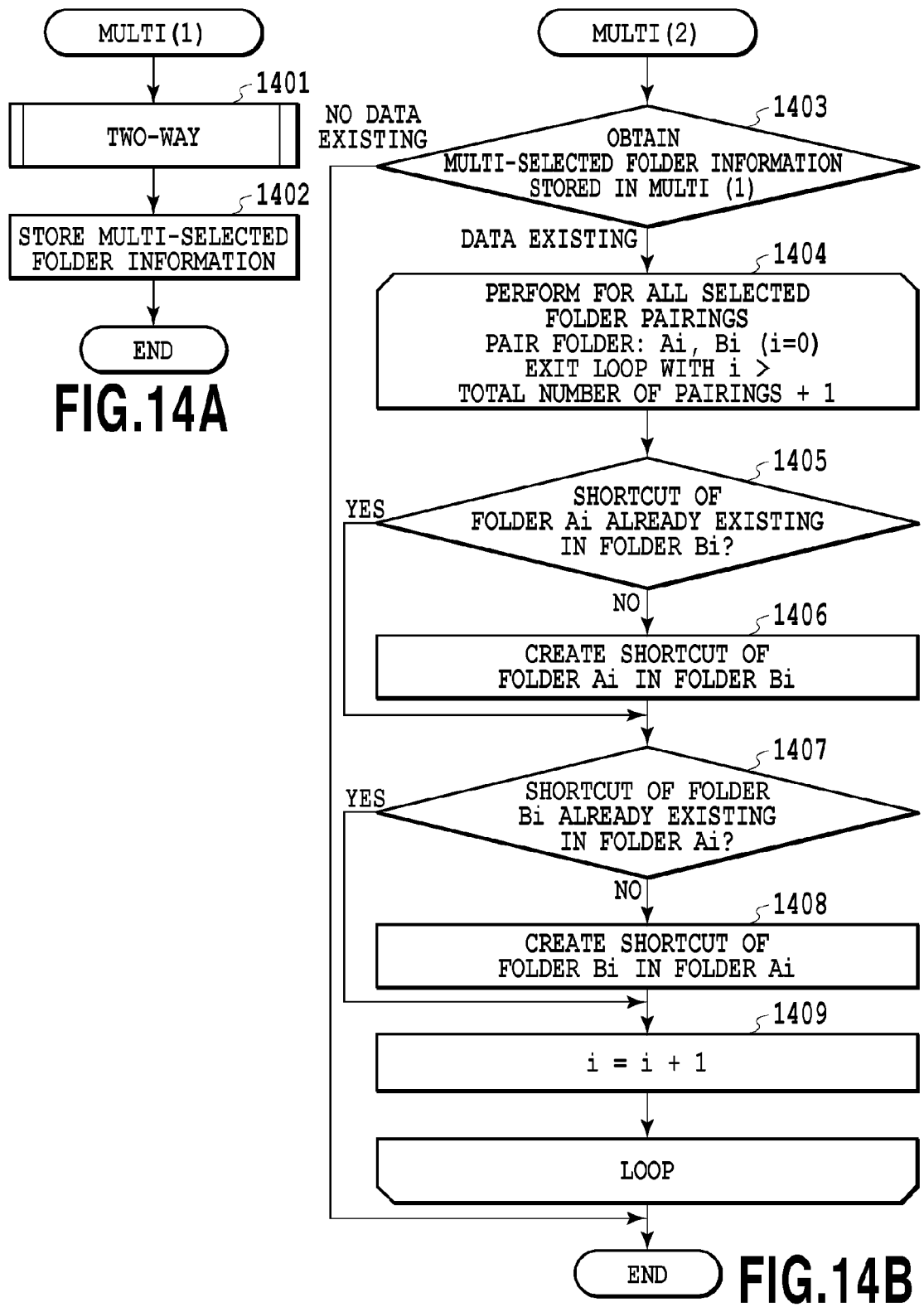
FIGS. 14A and 14B are flowcharts illustrating the detailed process flow of a multiple shortcut creation procedure, according to Embodiment 1 of the present invention.

Clicking on the execution button in a state as illustrated in FIG. 7 or 8 causes a shortcut creation request to be transmitted from the client device 102 to the document management server device 101. FIG. 12 is a flowchart illustrating the process flow of the shortcut creation procedure in a case where the document management server device 101 receives a shortcut creation request from the client device 102.

At step S1201, the document management server device 101 receives, as requested information, information relating to the reference folder, the selected folder, and the shortcut creation pattern. The received information relating to the reference folder, the selected folder, and the shortcut creation pattern is stored in the storage unit 302 of the document management server device 101 as shortcut management information.

At step S1202, the display content generating unit 301 of the document management server device 101 obtains, from the storage unit 302, folder information whose setting has been changed among the shortcut management information.

At step S1203, the process of step S1204 and one of the processes of steps S1205 to S1208 are repeated as many times as the number of selected folders.

At step S1204, the display content generating unit 301 determines which of "one-way (out)", "one-way (in)", "two-way", and "multi" the shortcut creation pattern is.

In a case where the display content generating unit 301 has determined at step S1204 that the shortcut creation pattern is "one-way (out)", the display content generating unit 301 performs a process of creating a "one-way (out)" shortcut at step S1205. The process of step S1205 will be described below (see FIG. 13A).

In a case where the display content generating unit 301 has determined at step S1204 that the shortcut creation pattern is "one-way (in)", the display content generating unit 301 performs a process of creating a "one-way (in)" shortcut at step S1206. The process of step S1206 will be described below (see FIG. 13B).

In a case where the display content generating unit 301 has determined at step S1204 that the shortcut creation pattern is "two-way", the display content generating unit 301 performs a process of creating a "two-way" shortcut at step S1207. The process of step S1207 will be described below (see FIG. 13C).

In a case where the display content generating unit 301 has determined at step S1204 that the shortcut creation pattern is "multi", the display content generating unit 301 performs the process of "multi (1)" at step S1208. The process of step S1208 will be described below (see FIG. 14A).

In a case where the display content generating unit 301 has determined at step S1209 that the shortcut creation pattern is "multi", the display content generating unit 301 performs the process of "multi (2)" at step S1210. The process of step S1210 will be described below (see FIG. 14B).

FIGS. 13A to 13C are flowcharts illustrating details of the process flow of step S1205 "one-way (out)", step S1206 "one-way (in)", and step S1207 "two-way" of FIG. 12.

<One-Way (Out)>

At step S1301, the display content generating unit 301 determines whether or not a shortcut of the reference folder supposed to be created from the storage unit 302 already exists under the selected folder. In a case where the display content generating unit 301 has determined that no shortcut of the reference folder exists under the selected folder, the display content generating unit 301 creates a shortcut of the reference folder under the selected folder at step S1302. In a case where the display content generating unit 301 has determined that a shortcut of the reference folder exists under the selected folder, the process is not performed.

<One-Way (In)>

At step S1303, the display content generating unit 301 determines whether or not a shortcut of the selected folder supposed to be created from the storage unit 302 already exists under the reference folder. In a case where the display content generating unit 301 has determined that no shortcut of the selected folder exists under the reference folder, the display content generating unit 301 creates a shortcut of the selected folder under the reference folder at step S1304. In a case where the display content generating unit 301 has determined that a shortcut of the reference folder exists under the reference folder, the process is not performed.

<Two-Way>

At step S1305, the display content generating unit 301 performs the processes of "one-way (out)" (steps S1301 to S1302). Subsequently, at step S1306, the display content generating unit 301 performs the processes of "one-way (in)" (steps S1303 to S1304). The order of step 1306 and step S1305 may be reversed.

FIGS. 14A and 14B are flowcharts illustrating details of the process flow of step S1208 "multi (1)" and step S1210 "multi (2)" of FIG. 12.

<Multi (1)>

At step S1401, the display content generating unit 301 performs the process of "two-way" (steps S1305 and S1306 of FIG. 13C). At step S1402, the display content generating unit 301 stores, in the storage unit 302, information of the folder for which "multi" has been selected.

<Multi (2)>

At step S1403, the display content generating unit 301 obtains, from the storage unit 302, information of the folder for which "multi" has been selected.

At step S1404, the display content generating unit 301 performs the processes of the following steps S1405 to S1409 for all the pairings of folders for which "multi" has been selected, using the information of the obtained folder for which "multi" has been selected. As illustrated in FIG. 14B, a folder pair is denoted as Ai and Bi. Here, i represents the combination number. The process starts with i=0, and exits the processing loop with i>total number of pairings+1.

At step S1405, the display content generating unit 301 determines whether or not a shortcut of the folder Ai already exists under the folder Bi.

In a case where it has been determined at step S1405 that no shortcut of folder Ai exists under the folder Bi, the display content generating unit 301 creates a shortcut of the folder Ai under the folder Bi at step S1406. Subsequently, the process flow proceeds to step S1407. In a case where it has been determined at step S1405 that a shortcut of the folder Ai exists under the folder Bi, the process flow proceeds to step S1407.

At step S1407, the display content generating unit 301 determines whether or not a shortcut of the folder Bi already exists under the folder Ai.

In a case where it has been determined at step S1407 that no shortcut of the folder Bi exists under the folder Ai, the display content generating unit 301 creates a shortcut of the folder Bi under the folder Ai at step S1408. Subsequently, the process flow proceeds to step S1409. In a case where it has been determined at step S1407 that a shortcut of the folder Bi exists under the folder Ai, the process flow proceeds to step S1409.

At step S1409, the display content generating unit 301 increments the pairing number i by one.

Embodiment 2

A second embodiment (Embodiment 2) of the present invention will be described, based on FIGS. 15, 16, 17A and 17B. The difference of the shortcut creation procedure according to Embodiment 2 from the folder shortcut creation procedure according to Embodiment 1 lies in that a shortcut of a document in the selected folder is created under the reference folder and that a shortcut of the reference document is created under the selected folder.

[Document Shortcut Creation Procedure]

In the following, a document shortcut creation method according to selection of a creation pattern in the present embodiment will be described, referring to FIGS. 15 and 16.

Figure 15:
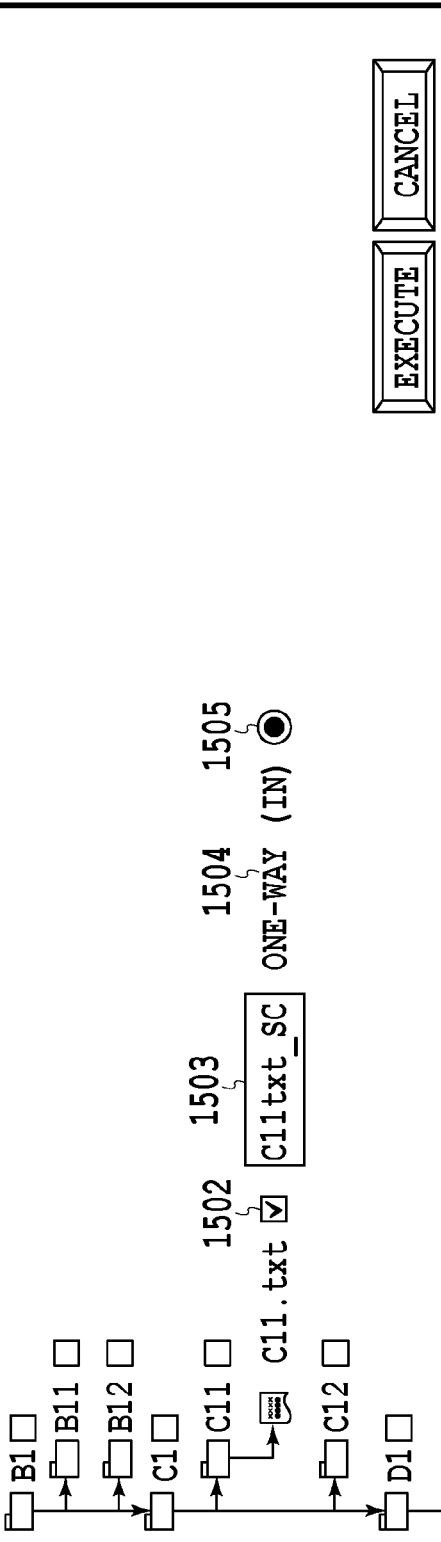
FIG. 15 illustrates an exemplary case of selecting a check box of a document displayed on a related folder/document selection tree display region, according to Embodiment 2 of the present invention.

FIG. 15 illustrates a case where the user has selected a check box 1502 of the document displayed on a related folder/document selection tree display region 1501. Checking the check box 1502 of the document causes a shortcut name input text box 1503 of the selected document, a shortcut creation pattern 1504 ("one-way (in)" in the present embodiment), and a radio box 1505 to be displayed next to the selected document. The user selects a shortcut creation pattern by checking the radio box 1505. In a case where the creation pattern "one-way (in)" 1504 as illustrated in FIG. 15 is selected and executed, a process of creating a shortcut (C11txt_SC in the present embodiment) of the selected document (document C11.txt in the present embodiment) under the reference folder (in the present embodiment, folder A1) is performed.

Figure 16:
FIG. 16 illustrates an exemplary state in a case where a check box of a folder displayed on the related folder selection tree display region is selected, according to Embodiment 2 of the present invention.

FIG. 16 illustrates a case where the user has selected, on a document property screen 1600, a check box of the folder displayed on a related folder selection tree display region 1601. Checking the check box of the folder causes a shortcut creation pattern 1602 ("one-way (out)" in the present embodiment) and a radio box 1603 for selecting a shortcut creation pattern to be displayed next to the selected folder. In a case where the creation pattern "one-way (out)" 1602 as illustrated in FIG. 16 is selected and executed, a process of creating a shortcut (A1txt_SC in the present embodiment) of the reference document (document A1 in the present embodiment) under the selected folder (folder B11 in the present embodiment) is performed.

Figure 17A:
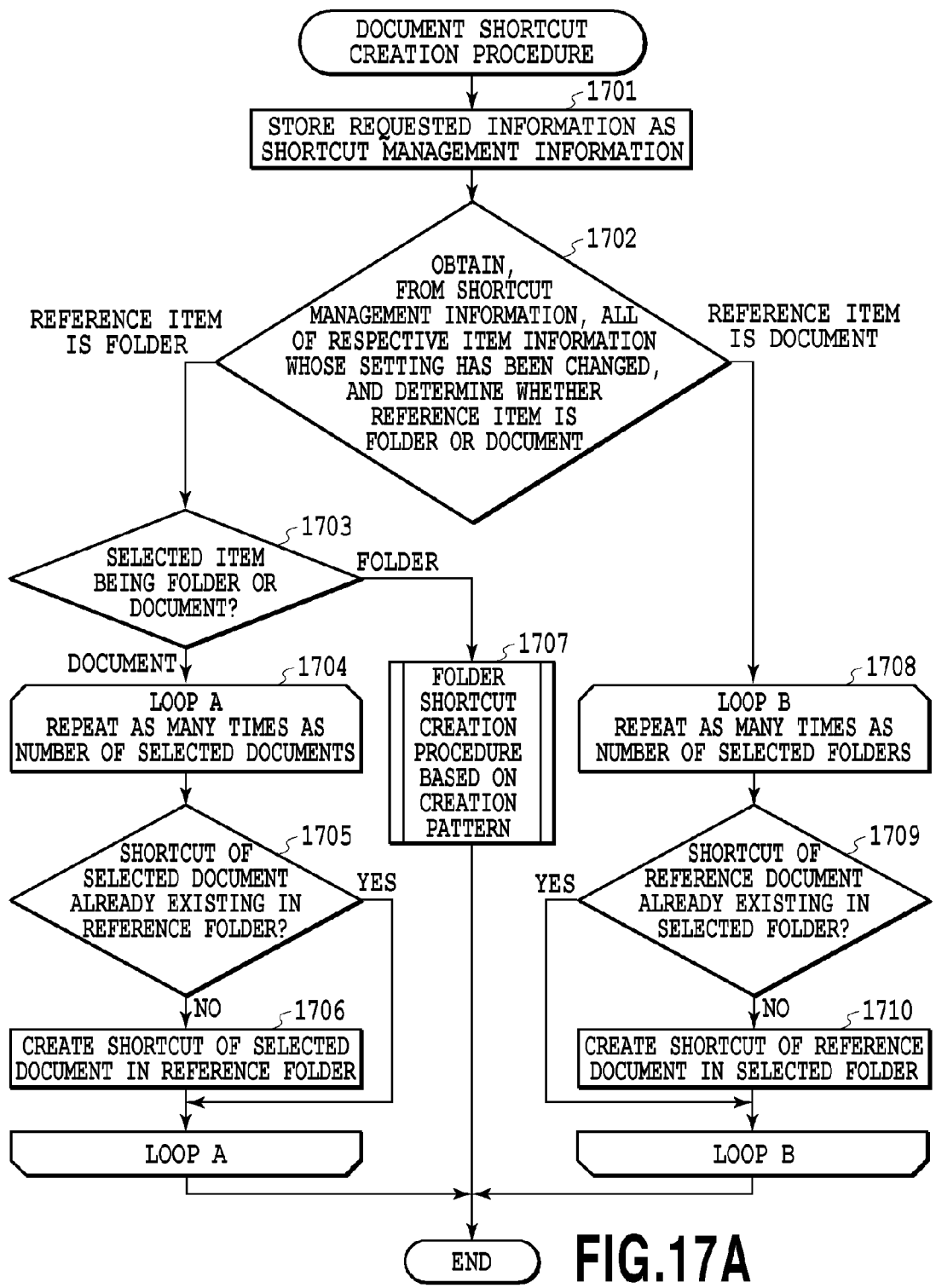
FIGS. 17A and 17B are flowcharts illustrating the process flow of a document shortcut creation procedure in a case where a document shortcut creation request is received, according to Embodiment 2 of the present invention.
Figure 17B:
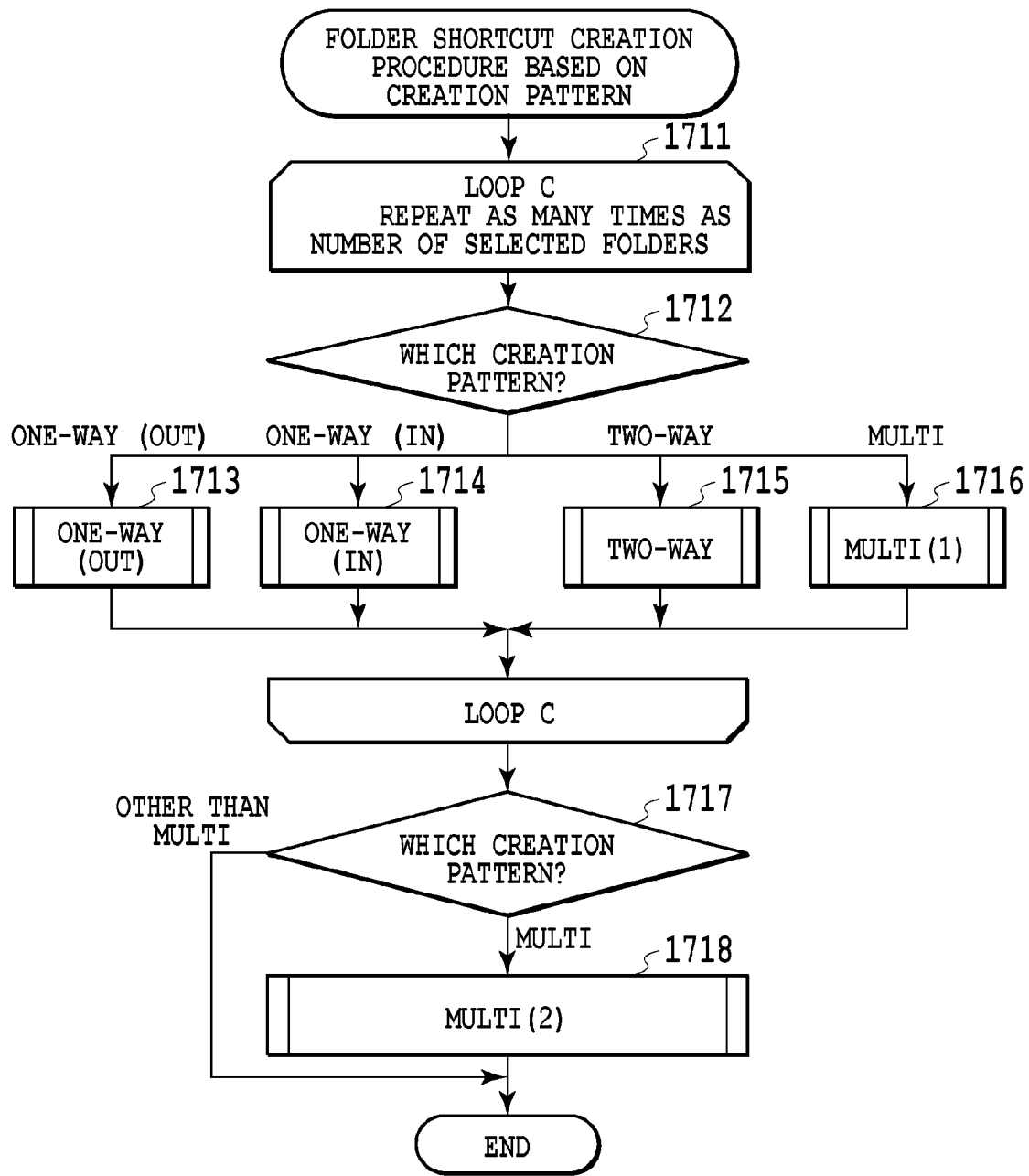

In the following, the process flow according to the present embodiment will be described, referring to the flowcharts of FIGS. 17A and 17B.

<Document Shortcut Creation Procedure>

Clicking on the execution button in a state as illustrated in FIG. 15 or 16 causes a shortcut creation request to be transmitted from the client device 102 to the document management server device 101. FIGS. 17A and 17B are flowcharts illustrating the process flow of the shortcut creation procedure in a case where the document management server device 101 receives a document shortcut creation request from the client device 102.

At step S1701, the document management server device 101 receives, as requested information, reference item information, selected item information, and shortcut creation pattern information. The reference item information, the selected item information, and the shortcut creation pattern information which have been received are stored in the storage unit 302 of the document management server device 101 as shortcut management information.

At step S1702, the display content generating unit 301 of the document management server device 101 obtains, from the storage unit 302, reference item information whose setting has been changed from among the shortcut management information, selected item information, and shortcut creation pattern information. Subsequently, the display content generating unit 301 determines, from the obtained reference item information, whether the reference item is a folder or a document. In a case where the display content generating unit 301 has determined that the reference item is a folder, the process flow proceeds to step S1703. In a case where the display content generating unit 301 has determined that the reference item is a document, the process flow proceeds to step S1708.

At step S1703, the display content generating unit 301 determines, from the obtained selected item information, whether the selected item is a folder or a document. In a case where the display content generating unit 301 has determined that the selected item is a document, the process flow proceeds to step S1704. In a case where the display content generating unit 301 has determined that the selected item is a folder, the process flow proceeds to step S1707.

At step S1704, the processes of steps S1705 and S1706 are repeated as many times as the number of selected documents.

At step S1705, the display content generating unit 301 determines whether or not a shortcut of the selected document already exists under the reference folder. In a case where it has been determined that no shortcut of the selected document exists under the reference folder, the process flow proceeds to step S1706. In a case where it has been determined that a shortcut of the selected document already exists under the reference folder, the process is not performed.

At step S1706, the display content generating unit 301 creates a shortcut of the selected document under the reference folder.

At step S1707, the folder shortcut creation procedure is performed, based on the shortcut creation pattern described in Embodiment 1. The flow of the folder shortcut creation procedure will be described later (see steps S1711 to S1718 of FIG. 17B).

At step S1708, the processes of steps S1709 and S1710 are repeated as many times as the number of selected folders.

At step S1709, the display content generating unit 301 determines whether or not a shortcut of the reference document exists under the selected folder. In a case where it has been determined that no shortcut of the reference document exists under the selected folder, the process flow proceeds to step S1710. In a case where it has been determined that a shortcut of the reference document already exists under the selected folder, the process is not performed.

At step S1710, the display content generating unit 301 creates a shortcut of the reference document under the selected folder.

In the following, the flow of the folder shortcut creation procedure at step S1707 will be described.

At step S1711, the process of step S1712 and some of the processes of steps S1713 to step S1716 are repeated as many times as the number of selected folders.

At step S1712, the display content generating unit 301 determines which of "one-way (out)", "one-way (in)", "two-way", and "multi" the shortcut creation pattern is.

In a case where the display content generating unit 301 has determined at step S1712 that the shortcut creation pattern is "one-way (out)", the display content generating unit 301 performs a process of creating a "one-way (out)" shortcut at step S1713. Since the process of step S1713 is similar to Embodiment 1, detailed description thereof will be omitted (see FIG. 13A).

In a case where the display content generating unit 301 has determined at step S1712 that the shortcut creation pattern is "one-way (in)", the display content generating unit 301 performs a process of creating a "one-way (in)" shortcut at step S1714. Since the process of step S1714 is similar to Embodiment 1, detailed description thereof will be omitted (see FIG. 13B).

In a case where the display content generating unit 301 determined at step S1712 that the shortcut creation pattern is "two-way", the display content generating unit 301 performs a process of creating a "two-way" shortcut at step S1715. Since the process of step S1715 is similar to Embodiment 1, detailed description thereof will be omitted (see FIG. 13C).

In a case where the display content generating unit 301 has determined at step S1712 that the shortcut creation pattern is "multi", the display content generating unit 301 performs the process of "multi (1)" at step S1716. Since the process of step S1716 is similar to Embodiment 1, detailed description thereof will be omitted (see FIG. 14A).

At step S1717, the display content generating unit 301 determines whether or not the shortcut creation pattern is "multi".

In a case where the display content generating unit 301 has determined at step S1717 that the shortcut creation pattern is "multi", the display content generating unit 301 performs the process of "multi (2)" at step S1718. Since the process of step S1718 is similar to Embodiment 1, detailed description thereof will be omitted (see FIG. 14B). In a case where the display content generating unit 301 has determined at step S1717 that the shortcut creation pattern is not "multi", the process is not performed.

According to Embodiment 2 of the present invention, it becomes possible to create a shortcut of a document of the selected folder in the reference folder and, in addition, it becomes possible to create a shortcut of the reference document in the selected folder.

Embodiment 3

A third embodiment (Embodiment 3) of the present invention will be described, based on FIGS. 18, 19, and 20. The difference of the folder shortcut creation procedure according to Embodiment 3 from the folder shortcut creation procedure according to Embodiment 1 lies in that the created folder shortcut can be displayed only at the time of move from another shortcut.

[Process Relating to a Setting of Displaying the Created Folder Shortcut Only at the Time of Move from the Shortcut]

In the following, a method of displaying the created folder shortcut only at the time of move from the shortcut in the present embodiment will be described, referring to FIGS. 18 and 19.

Figure 18:
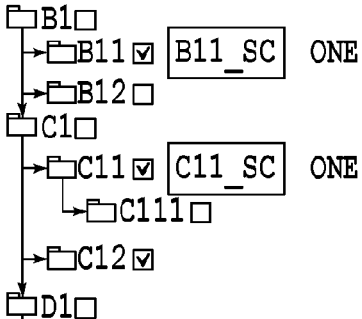
FIG. 18 illustrates an exemplary state in a case where a "set in the home shortcut list" setting and a "display only at the time of move from shortcut" setting are selected, according to Embodiment 3 of the present invention.

FIG. 18 illustrates a case where a "set in the home shortcut list" setting 1801 and a "display only at the time of move from shortcut" setting 1802 have been selected. The "set in the home shortcut list" setting 1801 is a setting of displaying the shortcut of the reference folder in the shortcut list of the home screen of the document management server device. The "display only at the time of move from shortcut" setting 1802 is a setting of displaying the created folder shortcut only at the time of move from the shortcut.

As an example, a case where the "set in the home shortcut list" setting 1801 is selected and executed will be described with regard to a shortcut of the reference folder (A1 in the example illustrated in FIG. 18). In this case, a shortcut 1805 (A1_SC in the example illustrated in FIG. 18) of the reference folder is displayed on a folder shortcut list display region 1804 of a document management system home screen 1803 of a document management server device.

Next, a case where the "display only at the time of move from shortcut" setting 1802 is selected and executed will be described as an example. In this case, the "set in the home shortcut list" setting 1801 is automatically selected. In addition, display of "one-way (out)" is cancelled in the shortcut creation pattern 1806. This is because the "display only at the time of move from shortcut" setting has been set and therefore it is impossible to display the shortcut of the reference folder created in the case where the shortcut of the reference folder is created under the related folder, which makes creation of the shortcut meaningless.

Figure 19:
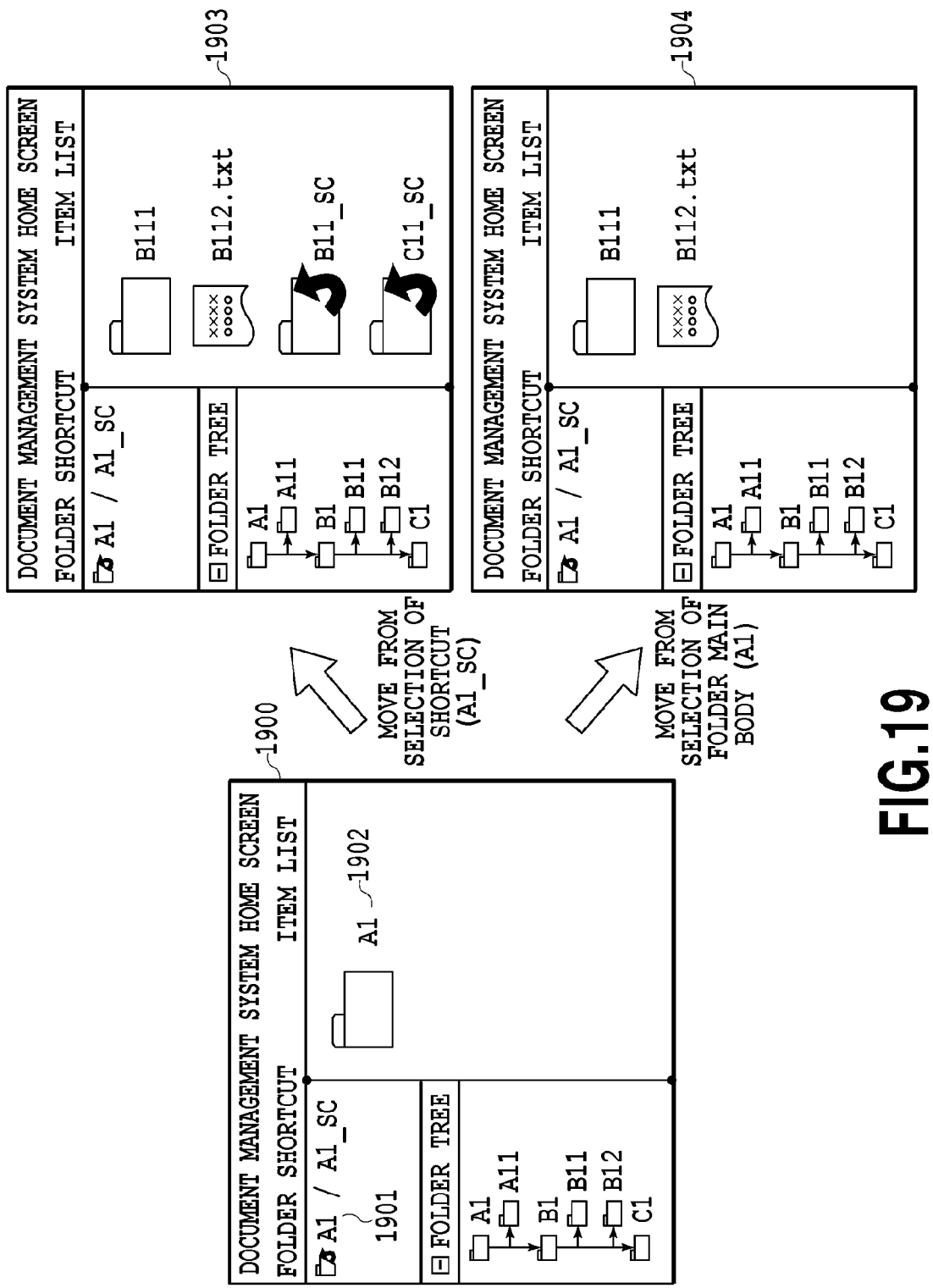
FIG. 19 illustrates the difference between displays of item lists caused by move from selection of a folder shortcut and move from selection of a folder main body in a case where the "display only at the time of move from shortcut" setting is selected, according to Embodiment 3 of the present invention.

FIG. 19 illustrates the difference between displays of item lists caused by move from the selection of a folder shortcut and move from the selection of a folder main body in a case where the "display only at the time of move from shortcut" setting 1802 is selected and executed.

In a case where a shortcut 1901 displayed on the folder shortcut list display region is selected, the shortcut created according to the setting illustrated in FIG. 18 (i.e., B11_SC and C11_SC) is displayed, as illustrated by the reference numeral 1903 in FIG. 19. However, in a case where a folder main body 1902 displayed on the item list display region 1900 is selected, the shortcut created according to the setting illustrated in FIG. 18 is not displayed, as illustrated by the reference numeral 1904 in FIG. 19.

In the following, the process flow according to the system will be described, referring to the flowchart of FIG. 20.

<Item List Display Procedure which Varies According to Presence or Absence of the "Display Only at the Time of Move from Shortcut" Setting>

Figure 20:
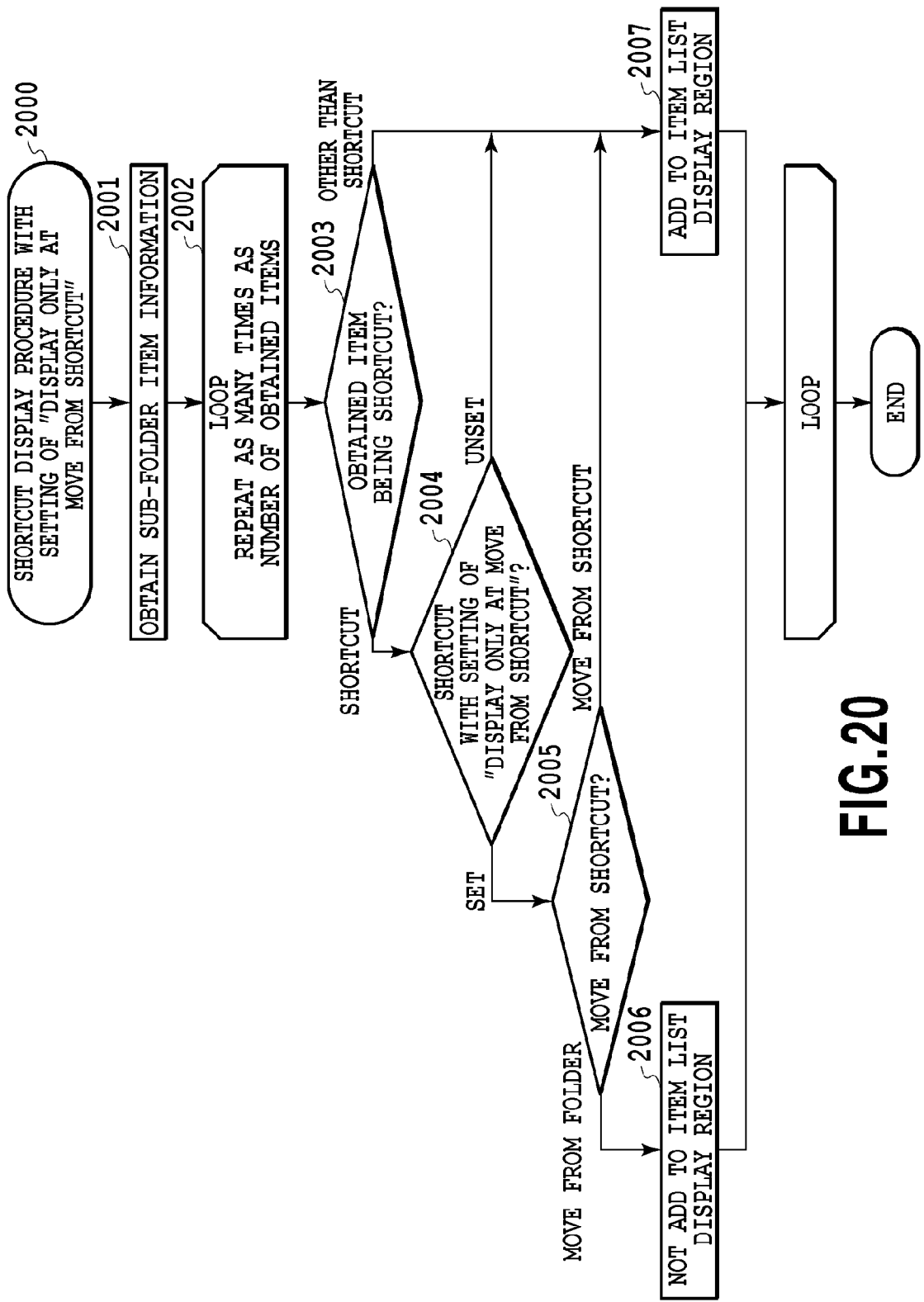
FIG. 20 is a flowchart illustrating the process flow of generating a sub-folder item list displayed in response to a move request caused by selection of a folder main body or selection of a folder shortcut on the home screen, according to Embodiment 3 of the present invention.

FIG. 20 is a flowchart illustrating the process flow of generating a sub-folder item list displayed in response to a move request caused by selection of a folder main body or selection of a shortcut on the home screen of the document management server device according to the present embodiment. As illustrated in FIG. 20, the process branches in accordance with presence or absence of the "display only at the time of move from shortcut" setting.

At step S2001, the display content generating unit 301 of the document management server device 101 obtains, from the storage unit 302 of the document management server device 101, sub-folder item information requested from the client device 102.

At step S2002, the display content generating unit 301 of the document management server device 101 repeats the following steps S2003 to S2007 as many times as the number of items under the folder, using the obtained item information.

At step S2003, the display content generating unit 301 of the document management server device 101 determines, from the obtained item information, whether or not an item under the requested folder (referred to as an "item in question" in the following) is a shortcut. In a case where it has been determined that the item in question is a shortcut, the process flow proceeds to step S2004. In a case where it has been determined that the item in question is something other than a shortcut (folder, document or the like), the process flow proceeds to step S2007.

At step S2004, the display content generating unit 301 of the document management server device 101 determines whether or not the shortcut which is the item in question is provided with the "display only at the time of move from shortcut" setting. In a case where it has been determined that the shortcut is provided with the "display only at the time of move from shortcut" setting, the process flow proceeds to step S2005. In a case where it has been determined that the shortcut is not provided with the "display only at the time of move from shortcut" setting, the process flow proceeds to step S2007.

At step S2005, the display content generating unit 301 of the document management server device 101 determines whether the request from the client device 102 is a request caused by selection of a folder main body or a request caused by selection of a folder shortcut. In a case where it has been determined that the request from the client device 102 is a request caused by selection of a folder main body, the process flow proceeds to step S2006. In a case where it has been determined that the request from the client device 102 is a request caused by selection of a folder shortcut, the process flow proceeds to step S2007.

At step S2006, the display content generating unit 301 of the document management server device 101 does not add the shortcut which is the item in question to the item list display region 1900.

At step S2007, the display content generating unit 301 of the document management server device 101 adds the item in question to the item list display region 1900.

With the method according to the present embodiment, it becomes possible to display a shortcut created by the present invention only at the time of move from the selection of a shortcut.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-273624, filed Dec. 14, 2012 which are hereby incorporated by reference herein in their entirety.

What is claimed is:

1. A shortcut creating apparatus comprising:
a memory storing a program; and
a processor that executes the program to control the apparatus to:
select a second folder to be associated with a first folder;
determine which one instruction has been selected by a user, among a first instruction for creating a shortcut of the second folder under the first folder, a second instruction for creating a shortcut of the first folder under the second folder, and a third instruction for creating a shortcut of the second folder under the first folder and also creating a shortcut of the first folder under the second folder;
create the shortcut of the second folder under the first folder if it is determined that the first instruction has been selected as the one instruction without selecting the second and third instructions;
create the shortcut of the first folder under the second folder if it is determined that the second instruction has been selected as the one instruction without selecting the first and third instructions; and
create the shortcut of the second folder under the first folder and also create the shortcut of the first folder under the second folder if it is determined that the third instruction has been selected as the one instruction without selecting the first and second instructions.

2. The shortcut creating apparatus according to claim 1, wherein, in a case where:
a plurality of second folders are selected; and
it is determined that a fourth instruction has been selected as the one instruction for creating shortcuts to different folders respectively under the first folder and the selected plurality of second folders,
the processor controls to create shortcuts to different folders respectively under the first folder and the selected plurality of second folders.

3. The shortcut creating apparatus according to claim 2, wherein a user interface for providing the fourth instruction is displayed if the plurality of second folders are selected.

4. The shortcut creating apparatus according to claim 1, wherein the processor further controls to display, on a user interface, check boxes respectively associated with a plurality of folders, and selects the second folder if a check box associated with the second folder is specified by a user.

5. The shortcut creating apparatus according to claim 4, wherein the user interface includes a text box for specifying a name of the shortcut of the selected second folder.

6. The shortcut creating apparatus according to claim 1, wherein, among a user interface for providing the first instruction, a user interface for providing the second instruction, and a user interface for providing the third instruction, which user interface is to be displayed varies depending on an access right to the first folder and an access right to the selected second folder.

7. The shortcut creating apparatus according to claim 1, wherein the processor controls to create a shortcut of a selected document under the first folder if a document to be associated with the first folder is selected.

8. The shortcut creating apparatus according to claim 1, wherein the processor further controls to:
perform a setting to display the created shortcut only at move from a different shortcut; and
display the created shortcut only at move from the different shortcut.

9. A shortcut creating method executed by a processor a shortcut creating apparatus, comprising:
selecting a second folder to be associated with a first folder;
determining which one instruction has been selected by a user, among a first instruction for creating a shortcut of the second folder under the first folder, a second instruction for creating a shortcut of the first folder under the second folder, and a third instruction for creating a shortcut of the second folder under the first folder and also creating a shortcut of the first folder under the second folder;
creating the shortcut of the second folder under the first folder if it is determined that the first instruction has been selected as the one instruction without selecting the second and third instructions;
creating the shortcut of the first folder under the second folder if it is determined that the second instruction has been selected as the one instruction without selecting the first and third instruction; and creating the shortcut of the second folder under the first folder and also creating the shortcut of the first folder under the second folder if it is determined that the third instruction has been selected as the one instruction without selecting the first and second instructions.

10. The shortcut creating method according to claim 9, wherein, in a case where:
   a plurality of second folders are selected; and
   it is determined that a fourth instruction has been selected as the one instruction for creating shortcuts to different folders respectively under the first folder and the selected plurality of second folders,
   shortcuts to different folders are created respectively under the first folder and the selected plurality of second folders.

11. A non-transitory computer readable storage medium storing a program for causing a computer to perform a shortcut creating method, the program comprising code for:
   selecting a second folder to be associated with a first folder;
   determining which one instruction has been selected by a user, among a first instruction for creating a shortcut of the second folder under the first folder, a second instruction for creating a shortcut of the first folder under the second folder, and a third instruction for creating a shortcut of the second folder under the first folder and also creating a shortcut of the first folder under the second folder;
   creating the shortcut of the second folder under the first folder if it is determined that the first instruction has been selected as the one instruction without selecting the second and third instructions;
   creating the shortcut of the first folder under the second folder if it is determined that the second instruction has been selected as the one instruction without selecting the first and third instruction; and
   creating the shortcut of the second folder under the first folder and also creating the shortcut of the first folder under the second folder if it is determined that the third instruction has been selected as the one instruction without selecting the first and second instructions.

* * * * *